Nov. 20, 1962
B. F. McNAMEE
3,065,399
REGULATED POWER SUPPLY
Filed Feb. 15, 1960
2 Sheets-Sheet 1
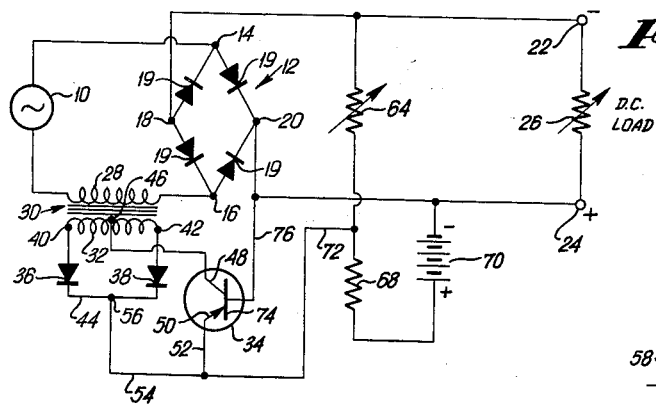
FIG. 1.
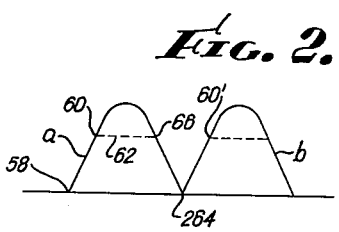
FIG. 2.
FIG. 3.
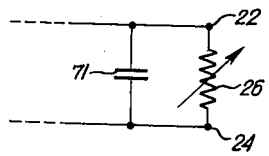
FIG. 4.
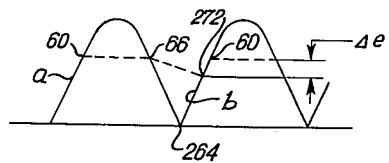
FIG. 6.
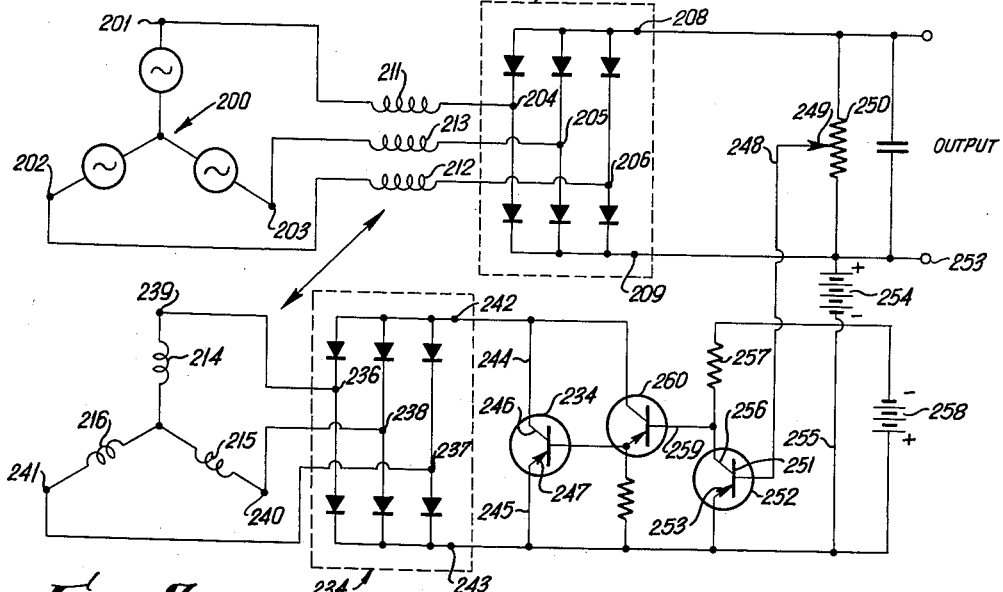
FIG. 7.
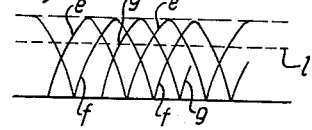
INVENTOR.
BERNARD F. McNAMEE
BY
Flam and Flam
ATTORNEYS Nov. 20, 1962 — B. F. McNAMEE — 3,065,399
REGULATED POWER SUPPLY
Filed Feb. 15, 1960 — 2 Sheets-Sheet 2

INVENTOR.
BERNARD F. McNAMEE
BY
Flam and Flam
ATTORNEYS

United States Patent Office
3,065,399
Patented Nov. 20, 1962

3,065,399
REGULATED POWER SUPPLY
Bernard F. McNamee, Altadena, Calif., assignor to Dressen-Barnes Electronics Corporation, a corporation of California
Filed Feb. 15, 1960, Ser. No. 8,656
14 Claims. (Cl. 321—18)

This invention relates to a transistorized D.C. regulated power supply and particularly to a power supply of this character that has a substantial voltage rating.

Series regulated power supplies utilizing transistors as variable conductance elements have been provided previously, the emitter and collector of the transistor being serially inserted in one of the power leads. The base and emitter of the transistor are connected across apparatus that senses departure of the load from a predetermined or preset standard in order that the conductance of the transistor be varied suitably to maintain the voltage within rated limits.

The difficulty of this arrangement is that if the power supply is to deliver something of the order of 50 or 100 volts or higher, the transistor must be a "high voltage" type capable of absorbing and dissipating substantial power in the power circuit.

While transistors capable of this use have been previously provided they are exceedingly expensive. Accordingly, the primary object of this invention is to provide a transistorized power supply capable of delivering a substantial voltage but which requires only inexpensive and low voltage transistors. This is made possible by using a transformer as a variable regulating element ahead of the rectifier input. The transformer secondary drives a variable impedance in the form of a low voltage transistor. This impedance is reflected into the primary circuit in such manner that the voltage delivered to the output terminals is maintained within rated values. As the voltage tends to follow a half sine wave, with the peak value well above the rated voltage, the control becomes effective during a portion of the cycle to insert an impedance into the excitation circuit. The voltage curve is accordingly clipped. A condenser may serve to sustain the voltage at or near the rated value.

The transformer has a substantial step-down ratio so that the transistor can be of the low voltage, but high current type. A simplified sensing and control circuit for this transistor is utilized and a remarkable regulation is achieved.

Another object of this invention is to obtain regulation for a D.C. power supply by clipping the peaks of the alternating current pulses.

Regulation can, of course, be improved by amplifying an error signal before it is applied to the control transistor. Amplification of a direct current signal corresponding to the departure of the output from a desired set point has been achieved in prior art devices where the control element or transistor is serially or conductively associated with the power circuit. However, certain design problems arise because a conductive path is inherent in a direct current amplifier. This means that various compensating voltage sources must be provided.

An object of this invention is to overcome such difficulties and provide D.C. isolation whereby amplification can be provided in a simple, straight-forward and expeditious manner in order to improve the regulation of the system.

Another object of this invention is to provide a circuit of the foregoing character for transistorized regulated power supplies usable in multiphase circuits and whereby a ripple content can be materially reduced. The voltage waves of the several phases overlap to prevent the voltage from falling to zero even when a condenser is not used. The addition of a small condenser results in remarkable performance.

Another object of this invention is to provide a transistorized D.C. power supply utilizing a variably loaded transformer secondary and in which ripple content is materially reduced in an expeditious and simple manner. For this purpose, in one form of this invention, use is made of a supplemental low voltage regulated power supply of standard form. This supplemental power supply operates in a unique manner to achieve improved regulation and virtual elimination of ripple content.

Another object of this invention is to provide an exceedingly effective D.C. power supply utilizing transistors which have exceptional characteristics as to regulation and ripple content without requiring any expensive or complex parts.

Another object of this invention is to provide an improved system for reducing ripple content of a D.C. power supply without requiring large filter condensers, if any.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a diagrammatic view of one form of a power supply incorporating my present invention;

FIG. 2 is a diagrammatic representation illustrating the manner in which the voltage wave is altered by the control;

FIG. 3 illustrates a filter condenser for use in conjunction with the circuit of FIG. 1;

FIG. 4 illustrates the wave shape of the power supply with the addition of the filter condenser of FIG. 3;

FIG. 6 is a circuit diagram of a regulated D.C. power supply excited by a three-phase A.C. source and comprising still another embodiment of the present invention; and FIG. 7 is a diagrammatic representation illustrating the wave shape produced by the power supply of FIG. 6.

Figure 5:
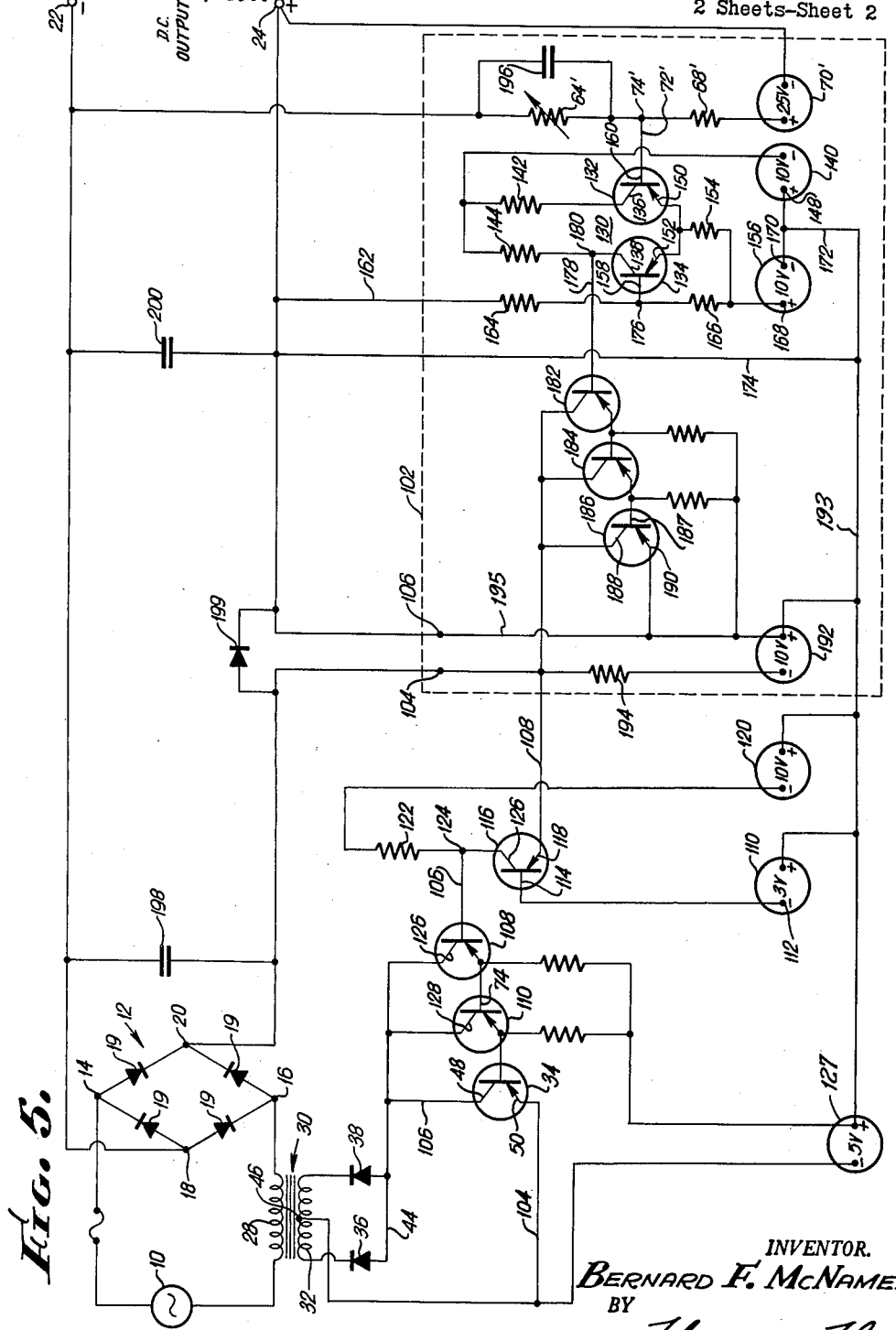
FIG. 5 is a diagrammatic view of a regulated D.C. power supply excited by a single phase A.C. source and comprising another embodiment of the present invention.

In FIG. 1 there is illustrated a power supply excited by an A.C. source 10. The A.C. source 10 is adapted to excite a full wave rectifier bridge 12. The bridge 12 has input terminals 14 and 16 to which the source 10 is connected. The bridge 12 also has quadrature or output terminals 18 and 20. Diodes 19 are connected between the four bridge terminals in a conventional manner to provide full wave rectified output. The bridge terminals 18 and 20 are respectively connected to load terminals 22 and 24 of the supply. A load 26 is illustrated as connected across the terminals 22 and 24.

Inserted in the input circuit to the rectifier bridge 12 is the primary winding 28 of an iron core transformer 30 that is preferably of the high efficiency toroid type. The transformer 30 has a center-tapped secondary winding 32. It is intended that an impedance be connected to the transformer secondary 32 for reflection into the primary circuit so as to control the intensity of excitation of the rectifier bridge 12. By such means the voltage at the load terminals 22 and 24 is regulated.

For the foregoing purposes, a transistor 34 is provided. Since the transistor 34 is itself a unidirectionally conductive device, special provisions must be made for its connection to the A.C. secondary winding 32. The coupling is established by two unidirectionally conductive diodes 36 and 38. The diode 36 is connected to one end terminal 40 of the transformer secondary 32, and the other diode 38 is connected to the other end terminal 42. The opposite sides of the rectifying diodes 36 and 38 are connected together by a lead 44. The transistor 34 is connected between the center-tap 46 of the transformer secondary 32 and the common connection 44 by having its collector 48 connected to the center tap 46, and its emitter 50 connected by leads 52 and 54, and terminal 56, connected to the common connection 44. Accordingly, conductive paths are provided through the transistor during all portions of the cycle of the source. Thus, when the terminal 42 is relatively more positive than the terminal 40, current passes via rectifying diode 38, terminal 56, connection 54, connection 52, emitter 50 and collector 48 to the center tap 46 and thence via one half of the transformer secondary to the terminal 42. When the secondary terminal is more positive, symmetrical operation results with the use of the rectifying diode 36.

The impedance of the transistor between its collector 48 and emitter 50 is thus reflected into the primary circuits.

The conductivity of the transistor 34 is controlled by the output voltage in such manner that the peaks of the voltage pulses are clipped at a value appropriate for production of the desired output. Thus, as illustrated in FIG. 2, the curve a and the curve b represent in solid lines a full cycle of the excitation voltage as it appears across the bridge output terminals 18 and 20. When the excitation voltage is zero, as at 58, the impedance of the transformer 30 is virtually zero by virtue of the fact that the transistor 34 is saturated, the saturation being accomplished in a manner hereinafter to be described. Thus, no appreciable voltage is absorbed by virtue of this load in the input circuit for the diode bridge 12. Accordingly, the voltage climbs along the curve a to a point 60. At this time the voltage pulse is intended to be clipped along the dotted line 62. To achieve this result the saturation of the transistor is reduced and impedance of the transistor 34 is increased when the supply voltage reaches a value corresponding to the point 60.

For this purpose, a sensing circuit is connected across the output terminals 22 and 24. It comprises two resistors 64 and 68 and a battery 70, all serially connected together. The negative terminal of the battery 70 is connected to the common load terminal 24 which in this case is positive. The positive terminal of the battery 70 is connected to one end of the resistor 68. The remote end of the companion resistor 64 is connected to the high potential load terminal 22.

The resistors 64 and 68 form a voltage divider between which a sensing connection 72 is joined. The sensing connection 72 connects via lead 52 to the transistor emitter 50. The base 74 of the transistor 34 connects via a connection 76, to the common output terminal 24.

When the source voltage is zero, as at 58 in FIG. 2, the sensing connection 72 is a predetermined amount positive relative to the transistor base 74, this being determined by the value of the potential difference across battery 70 and the ratio of the values of the resistors 64 and 68. This preponderance of positive voltage sends a saturating current between the emitter 50 and base 74, such that the transistor 34 conducts heavily, corresponding to very low impedance. Accordingly, the source voltage is virtually unimpeded as it is applied to the load terminals via transformer 30 and bridge 12. As the source voltage rises along the curve a, the increasing voltage has the effect of pulling the sensing connection 72 more negative (or less positive) relative to the load terminal 24. The saturating current through the transistor 34 recedes toward the knee of the saturation curve. Finally, the saturating current reaches the knee of the saturation curve whereby it begins to affect the conductivity of the transistor. This happens by design when the source voltage reaches the point 60. The voltage of the point 60 in effect is chosen by selection of appropriate values for the elements of the sensing circuit 64—68—70. At the critical point, a further reduction in voltage at the sensing connection 72 thus begins to increase the impedance of the transistor 34. Accordingly, the bridge excitation is reduced, and the bridge output follows the dotted line 62. The control transistor 34 prevents the bridge output voltage from rising, except at a very slow rate which corresponds to the increase necessary to bring about further increase in transistor impedance. The rise is kept quite small because of the nature of the characteristics of the transformer. Thus, a very slight voltage change is effective materially to change the transistor impedance.

As the source voltage just passes its peak, the impedance required to be inserted into the excitation circuit to hold the voltage relatively constant is diminished. The sensing circuit detecting a decrease in voltage thus begins to increase the transistor saturation to reduce the impedance. Finally the point 66 is reached which is symmetrically related to the point 60 and thereafter the impedance of the transistor is virtually nil until a point 60' on the succeeding voltage pulse is reached that corresponds to the point 60. The dotted line 62 is thus very slightly and imperceptibly humped.

The regulator of FIG. 1 can be adjusted by varying the relative proportions of the resistors 64 and 68. Thus, the clipped portion of the voltage curve can be raised or lowered in order to obtain the desired load voltage.

The voltage produced by the regulator of FIG. 1 and as depicted by the graph of FIG. 2 inherently produces a substantial ripple voltage by virtue of the fact that bridge output voltage falls to zero. Of course, the ripple could be reduced by providing a relatively high voltage excitation source, whereby the phase relationship of successive symmetrical control points, as at 60 and 66 approximates 180°. This, of course, is not practical.

The troughs between pulses however, can largely be minimized by connecting a condenser across the output terminals 22 and 24. Such a condenser 71 is illustrated in FIG. 3. The voltage thus falls from the point 66 of FIG. 4, not to the zero point 264, but instead to a point 272 along the successive curve b that is relatively close to the critical control point 60. The ability of the condenser 71 to sustain the load, of course, determines the value of Δe which measures the ripple content. Hence ripple depends upon the size of the condenser and the load. The greater the load, the farther the voltage will dip between successive pulses, and the larger the condenser 71, the less the value of Δe. Exceptional ripple reduction can be obtained by the use of a relatively small filter condenser 71 in combination with a regulator that clips the peaks of a sine wave.

The transistor 34, although it conducts heavy current, is never subjected to a substantial voltage because the transformer 30 has a substantial step-down turns ratio. Accordingly, the transistor 34 is of the inexpensive low voltage type.

In the form illustrated in FIG. 5, the ripple content is expeditiously minimized by the use of a simple auxiliary shunt regulated low voltage power supply 102 shown in the dotted enclosure in the lower right hand portion of FIG. 5. Parts corresponding to those of FIG. 1 are correspondingly numbered. Thus a single phase voltage source 10 is illustrated along with the transformer 30. The full-wave rectifying bridge 12 is illustrated with its output terminals 18 and 20. The power supply has load terminals 22 and 24, the common or reference terminal being the positive terminal 24.

The bridge output terminal 18 connects directly to the load terminal 22, but the bridge output terminal 20 connects to the common load terminal 24 via output terminals 104 and 106 of the auxiliary power supply 102. Accordingly, the voltage at the load terminals 22 and 24 consists of the sum of the output from the rectifier bridge 12 and the output from the auxiliary power supply 102.

The power supply 102 is driven by an unregulated D.C. source of relatively low voltage, and is intended to produce something of the order of a few percent of the total output voltage across the load terminals 22 and 24. This is generally of the order of ripple voltage to be compensated by the system. If the load terminals are to deliver 100 volts, for example, the power supply 102 will provide a nominal three volt output across its terminals 104 and 106. The terminals 104 and 106 are so arranged that the voltage produced by the bridge 12 and the supply 102 are cumulative. The nominal voltage delivered by the bridge 12 is then 97 volts.

During that portion of the cycle at which source 10 is adequate to provide 97 volts, impedance is introduced into the bridge excitation circuit as in the previous form. In the present instance, however, voltage at the load terminals causes a change in the voltage of the supplemental supply, and this in turn, controls the conductivity of the control transistor 34, all in a manner to be described hereinafter. When the excitation voltage drops from its peak value to a critical value, increase in transistor conductivity is of course no longer effective to ensure 97 volt bridge output. The supplemental power supply now begins its major function of filling in the gaps between troughs of the main source excitation wave. The supplemental power supply is forced to do this because the source 10 refuses to respond.

When the source 10 rises on the next wave, the supplemental power supply automatically responds and reduces its output so that the combined voltage totals the voltage rating. The critical voltage value is next reached at which point impedance must be introduced into the bridge excitation circuit, and the cycle is repeated. The supplemental power supply thus complements the main source. Filter condensers 198 and 200 make it possible for the power supply 102 to be of truly small rating.

The supply 102 is provided with a voltage source 192. The positive terminal of the source 192 is connected to connections 193 and 195, both common to the main load terminal 24 and to terminal 106. The other terminal of the source 192 is connected to the other auxiliary supply terminal 104 through a load resistor 194. Connected across the terminals 104 and 106 is a variable shunt element in the form of a transistor 186. Thus the transistor has an emitter 190 connected to the common connection 195, and a collector 188 connected to the output terminal 104. The conductivity of the transistor 186 is varied in order to cause the voltage drop across the load resistor 194 correspondingly to vary whereby regulation is achieved.

The shunt transistor 186 is controlled by the voltage across the load terminals 22 and 24 so that the signal thereby fed back tends to restore the voltage at the load terminals 22 and 24 to a preset value, in this instance, 100 volts. Accordingly, the output of the supplemental supply is not necessarily constant because the feedback signal is not derived directly from the output terminals 104 and 106.

In the present instance the supply 102 must provide a variable output voltage that goes above and below its nominal rating, in this instance three volts. An increase is required to fill in the troughs between successive pulses of the main source. A decrease is required in order critically to provide a control voltage for throttling the main source.

The voltage at the load terminals 22 and 24 is sensed by the aid of resistors 64', 68' and a biasing reference source 70'. These parts correspond to the resistors 64, 68 and the battery 70 of the form illustrated in FIG. 1. A few percent of the voltage at the terminal 22 is sensed by a connection 72' that extends from the junction 74' between the resistors 64' and 68'.

As the output at the load terminals 22 and 24 drops, it is intended that the output of the supplemental power supply 102 be increased as previously described. Thus, as the potential at the junction 74' becomes less negative, the output terminal 104 of the supplemental power supply 102 must become increasingly negative. The terminal 104 is made increasingly negative by decreasing the conductivity of the control transistor 186. To do this, the potential of its base 187 must become less negative in order to reduce the control current. Accordingly, since the base 187 must become less negative when the junction 74' becomes less negative, the phase relationship of a signal from junction 74' to the base 187 must be preserved. At the same time, it is important for the difference of the voltage at the junction 74' from a predetermined norm to provide a definite signal for ultimate application to the base 187. A comparison transistor might be used, as in the FIG. 1 form. However, to prevent temperature drift from affecting the signal, a balanced amplifier is especially suitable for use in the first amplifying stage since the signal is of low level and readily upset or obliterated by temperature changes. A balanced amplifier 130, which is conventional in form is thus provided. The balanced amplifier eliminates or largely compensates for any temperature drift because two symmetrical branches presumably drift equally, and output is obtained from the net change of the operation of the branches. Reliable output that linearly represents the input is thus obtained. At the same time the balanced amplifier provides a choice of outputs at 0° or at 180° in phase relation to the input. Since a usual voltage amplifier inherently produces a 180° phase shift, the balanced amplifier serves additionally as a means for maintaining the required phase relationship between junction 74' and base 187.

The balanced amplifier 130 includes two transistors, 132 and 134. The transistor 134 forms the reference standard. For this purpose its base 158 is held in fixed voltage relationship to the common load terminal 24. A closed loop is provided that is tied to the terminal 24, the loop including a small D.C. source 156. The loop may be traced as follows: terminal 24, a lead 162, dividing resistors 164 and 166, the positive terminal 168 of the source 156, the negative terminal 170, leads 172 and 174 back to the common load terminal 24. A junction 176 between the dividing resistors 164 and 166 is conductively tied to the transistor base 158. Hence the base is at a fixed voltage.

The base 160 of the other transistor 132 is connected by the sensing connection 72' to the junction 74'. The output circuits for the transistors are formed between the emitters 150 and 152 and the collectors 136 and 138.

A source 140 for driving the transistor load circuits is provided. It has a positive terminal 148 tied via leads 172 and 174 to the common output terminal 24. Its negative terminal 149 is connected to the transistor collectors 136 and 138 respectively via load resistors 142 and 144. The emitters 150 and 152 of the transistors are both connected to one end of a coupling resistor 154. The other end of the coupling resistor 154 is connected to the plus (+) terminal 168 of the supply 156 in order conveniently to coordinate the voltages at the emitters 150 and 152 to the voltages at the bases 160 and 158 to operable ranges.

Departure of the voltage at junction 74' from the voltage at the junction 176 upsets the balanced amplifier and a signal output is obtained from the output circuit of one of the transistors. Thus as the voltage of the sensing connections 72' becomes less negative, for example, the conductivity of the transistor 132 decreases in response to decreased control current. By virtue of the coupling resistor 154, decreased control current to the transistor 132 results in increased control current to the other transistor 134. The collector 138 accordingly becomes less negative as the collector 136 becomes more negative. For purposes of satisfying the phase relationship required, the output from the balanced amplifier 130 is taken by a lead 178 connected as at 180 to the collector 138.

The signal at the lead 178 is applied appropriately to the base 187 of the control transistor 186 but through two stages of transistor amplification, the transistors for this purpose being illustrated at 182 and 184.

As described previously, the control transistor 34 for throttling the rectifier excitation by cooperation with the transformer 30 comes into operation upon an increase in the load voltage, that is, when the potential of the supplemental supply terminal 104 becomes less negative than three volts. The voltage at terminal 104 of course falls below three volts when the balanced amplifier 130 is upset by increase in negative voltage at sensing connection 72′.

A comparison transistor 116 is provided in order to signal a drop in voltage at output terminal 104. Its emitter 118 is connected to the output terminal 104 via a lead 108. Its base 114 is connected via lead 115 to the negative terminal 112 of a reference voltage source 110. The positive terminal 113 of the source 110 is connected to the common lead 193.

When the potential of the supply terminal 104 becomes less negative than the three volt standard fixed by the source 110, control current flows between the base 114 and emitter 118 and the transistor 116. As the voltage at terminal 104 falls, the control current increases. This induces increased current flow in a load circuit for the transistor 116.

Load current for transistor 116 flows from emitter 118, which is at an assumed potential of about three volts, collector 126, load resistor 122 and a negative terminal of a source 120 having a voltage more negative than three volts, and in this example, ten volts. A signal derived from the collector 126 is applied to the base 74 of the transistor 34 via amplifying transistors 126 and 128. Accordingly, as the base 74 of the control transistor 34 becomes more positive, its control current is reduced and the impedance of the transistor 34 is substantially increased. This results in modification of the voltage excitation to the bridge 12.

A source 127 biases transistors 34, 110 and 108 to a potential suitable for cooperation with the input circuit. The transformer secondary 32 completes the load circuits for the transistors 110 and 118.

The output of the supplemental supply 102 oscillates about three volts at twice the supply frequency, at times filling in troughs, and at times clipping the source voltage.

A condenser 196 provides a shunt around the resistor 64′ to provide low impedance at ripple frequencies. This means that the balanced amplifier 130 in effect has a gain many times higher for ripple components than to steady state components.

Since the control transistor 34, cooperable with the transformer 30, is modified by the output of the auxiliary or supplemental power supply 102, it is possible to provide a simple single adjustment for changing the output voltage. The adjustment is accomplished by variation of the value of the resistor 64′. The action of the circuit is to maintain the voltage at point 74′ constant. A change in the value of resistor 64′ will thus result in a change in the output voltage which will be required to hold the voltage at the point 74′ constant.

Thus, assuming that the resistor 64′ is increased, making the voltage at junction 74′ more positive, the output of the supply 102 must accordingly rise farther during the time when the source 10 is unable to satisfy the voltage requirement. When, however, the voltage of the source 10 ultimately rises to a point where it satisfies the voltage requirement, the output of the supply 102 diminishes to and below three volts. At the point when it reduces to and below three volts, whatever the setting of the balanced amplifier, the control regulator 34 is automatically operable. Hence, a single control appropriately shifts the regulator to a variable operating point.

As the operating voltage is changed, the source voltage is clipped at different heights. This changes the relative proportion of time and the relative amplitude of operation of the supplemental supply 102 on the one hand and the control transistor 34 on the other.

If the load terminals 22 and 24 become inadvertently shorted, the condenser 198 will tend to send a current via collector 188 and emitter 190 of transistor 186 and via terminals 106, 24 and 22 to the other side of the condenser 198. This, of course, would impose a substantial reverse voltage on the transistor 186. In order to prevent the application of such voltage a preferential shunt path is provided through a diode 199. The diode 199 bridges the terminals 104 and 106. The conductive direction of the diode 199 for this protective purpose is opposite the normal current direction. Hence, it does not interfere with normal operation.

In FIG. 6 there is illustrated a regulated supply utilizing a three-phase source and two stages of amplification. The three-phase supply 200 has three output terminals 201, 202 and 203 conected to three input terminals 204, 205 and 206 of a three-phase rectifier structure 207. The rectifier structure 207 has D.C. output terminals 208 and 209.

In FIG. 7 there is illustrated the rectified voltage due to each phase at the output of the rectifier. Of course, these components produce a cumulative output. Thus, at $e$ is illustrated the rectified voltage curve produced from one phase, at $f$ the rectified voltage curve produced by the second phase, and at $g$ the rectified voltage curve produced by the third phase. Since these voltage pulses overlap, in successive 60° relationship due to rectification, the output voltage is prevented from falling to zero. Accordingly, there is less inherent ripple in a three-phase excited system than in a single phase system. By clipping the three voltage pulses along a line $l$ exceptional regulation and reduction of ripple is obtained.

For this purpose, transformer primary windings 211, 212 and 213 are interposed in the bridge excitation circuit. These primary windings 211, 212 and 213 cooperate with secondary windings 214, 215 and 216.

The secondary windings 214, 215 and 216 together drive an adjustable impedance in the form of a control transistor 234. The transistor 234 functions analogously to the transistor 34 of the forms shown in FIG. 1. For coupling the A.C. secondaries 214, 215 and 216 to the D.C. transistor, a three-phase rectifier 235 is provided. The rectifier 235, like the rectifier 207 has three-phase terminals 236, 237 and 238 respectively cooperable with the secondary windings 214, 215 and 216 at terminals 239, 240 and 241 thereof. The rectifier 235 also has D.C. terminals 242 and 243 connected respectively by leads 244 and 245 to the collector 246 and emitter 247 of the transistor 234.

A sensing connection 248 serves to alter the conductance of the transistor 234 upon deviation of the output from a preset value. The sensing connection 248 cooperates with a slider 249 in turn cooperable variably with a resistor 250. The lead 248 cooperates with the base 251 of a comparison transistor 252. The emitter 253 of the transistor 252 is held at a fixed value relative to the common load terminal 253 of the supply by the aid of a battery or other source 254. The plus (+) terminal of the battery is connected to the common output terminal 253 and the minus (−) terminal of the battery is connected via lead 255 to the emitter 253. When the sensing connection 248 becomes less negative than the battery 254, the transistor 252 control current increases. This causes amplified current output in the load circuit for the transistor 252. The load circuit includes the emitter 251, a collector 256, a resistor 257 and a source of current 258. A second amplifying transistor 260 couples the comparison transistor 252 and the control transistor 234.

The action of the circuit of FIG. 6, like that of the circuit of FIG. 1, causes the pulses of rectifier excitation voltage to become clipped generally as along the line *l* of FIG. 7. Exceptional regulation is readily obtainable by the simple, efficient low voltage control structures illustrated.

The multiphase system of FIG. 6 may also be used in a supplemental supply system, such as in FIG. 5 to achieve an extremely close regulation.

The inventor claims:

1. In a transistorized voltage regulated power supply means forming input terminals to which an alternating current source may be connected; means defining load terminals to which a load may be connected; a rectifier; a transformer having one winding in circuit with the rectifier and inserted between the load terminals and the input terminals; said transformer having a second winding; means forming an adjustable load circuit for the second winding, including a transistor; a supplemental D.C. supply having a rated variable output; means inserting the output of the supplemental supply ahead of one of the load terminals; means responsive to drop in voltage at the load terminals below a preset value for increasing the output of the supplemental supply; and means responsive to increase in voltage at the load terminals for increasing the impedance of the load circuit for said secondary.

2. In a transistorized voltage regulated power supply means forming input terminals to which an alternating current source may be connected; means defining load terminals to which a load may be connected; a rectifier; a transformer having one winding in circuit with the rectifier and inserted between the load terminals and the input terminals; said transformer having a second winding; means forming an adjustable load circuit for the second winding, including a transistor; a supplemental D.C. supply having a rated variable output; means inserting the output of the supplemental supply ahead of one of the load terminals; means responsive to deviation in the voltage at the load terminals from a preset value for adjusting the output of supplemental supply in a compensating direction; and means responsive to decrease in the output of the supplemental supply from its rated value for increasing the impedance of the load circuit for said secondary.

3. The combination as set forth in claim 2 together with means for adjusting the preset voltage value with respect to which said supplemental supply operates whereby the A.C. excitation is automatically clipped at a different voltage level.

4. The combination as set forth in claim 2 in which a balanced amplifier is provided for cooperation with a sensing circuit for providing a signal adjusting the output of said supplemental supply, the balanced amplifier provides alternately phased output choices for ensuring that increase in output voltage produces a decrease in the output of the supplemental supply.

5. The combination as set forth in claim 2 in which a filter condenser shunts the output terminals including the supplemental supply, in which the supplemental supply incorporates a transistor as a shunt control element, and in which a diode shunts the output of the supplemental supply to protect its transistor upon short circuiting of the load terminals.

6. In a transistorized voltage regulated power supply means forming input terminals to which an alternating current source may be connected; means defining load terminals to which a load may be connected; a rectifier; a transformer having one winding in circuit with the rectifier and inserted between the load terminals and the input terminals; said transformer having a second winding, the turns ratio between the one winding and the second winding being greater than unity; means forming an adjustable load circuit for the second winding, including a transistor; a supplemental D.C. supply having a rated variable output; means inserting the output of the supplemental supply ahead of one of the load terminals; means responsive to deviation in the voltage at the load terminals from a preset value for adjusting the output of supplemental supply in a compensating direction; and means responsive to decrease in the output of the supplemental supply from its rated value for increasing the impedance of the load circuit for said secondary.

7. In a voltage regulated power supply: means defining input terminals to which an alternating current source may be connected; means defining output terminals to which a load may be connected; a rectifier inserted between the input terminals and the output terminals; an impedance device having a saturation function of a certain variable; said impedance being immediately controllable by said variable below the knee of its saturation characteristic; means serially coupling the device to the rectifier so that, when saturated, a small impedance is connected with the rectifier, and so that, when unsaturated, a larger impedance is connected with the rectifier in accordance with the characteristics of the device below the knee of its saturation characteristics; bias means operating upon said variable normally to saturate said impedance; and means modifying said variable only in response to and in accordance with the instantaneous value of output voltage at said output terminals and in opposition to said bias means to cause the knee of the saturation characteristic to be passed and to cause said impedance to operate in its unsaturated controllable state when the output voltage increases beyond a preselected instantaneous value determined by said bias means.

8. The combination as set forth in claim 7 in which said variable impedance device comprises transistor means, and in which said variable is base current.

9. The combination as set forth in claim 8 in which a condenser shunts the load terminals thereby to limit the swing of output voltage with respect to said preselected value.

10. The combination as set forth in claim 8 in which said output voltage responsive means comprises a battery and two resistance components all serially connected across the output terminals, and an input circuit for said transistor means excited by the voltage across the battery and the contiguous resistance component; the battery being so polarized that an increased load voltage increases the current through the resistance components from the value at zero load voltage.

11. The combination as set forth in claim 10 in which said coupling means comprises a transformer having a a primary winding serially connected to said rectifier and a secondary winding connected symmetrically to said transistor means.

12. The combination as set forth in claim 7 in which said rectifier is of the multiphase type, the input terminals being cooperable with a multiphase source whereby output voltage is sustained at a minimum level above zero.

13. In a voltage regulated power supply: means defining input terminals to which an alternating current source may be connected; means defining output terminals to which a load may be connected; a rectifier inserted between the input terminals and the output terminals; a variable impedance device having a saturation characteristic with respect to a certain variable; said impedance being immediately controllable by said variable below the knee of its saturation characteristic; means connecting the device to the rectifier so that, when saturated, a small impedance is connected to the rectifier and so that, when unsaturated, a larger impedance is connected to the rectifier in accordance with the characteristics of the device below the knee of its saturation characteristics; a supplemental D.C. supply having a rated variable output serially inserted ahead of the output terminals; means responsive to the drop in instantaneous value of voltage at the output terminals below a preset value for increasing the output of the supplemental supply; and means responsive to a decrease in the instantaneous value of voltage of the supplemental supply below its rated output for modifying said variable in accordance with said value; and bias means for causing the knee of the saturation characteristic to be reached when the output voltage of the supplemental supply reachese its rated value.

14. In a voltage regulated power supply: means forming input terminals to which an alternating current source may be connected; means forming load terminals to which a load may be connected; a rectifier inserted between the input terminals and the load terminals; a transformer having a primary in circuit with the rectifier, and having a secondary; a controllable transistor having its emitter and collector coupled to said secondary; said transistor having a base; bias means normally saturating said transistor; circuit means sensing and responding to the instantaneous value of load voltage at said load terminals and operable increasingly to oppose said bias means as the instantaneous value of load voltage increases, and counterbalancing said bias means adequately to cause operation of said transistor in its controllable unsaturated state when the load voltage reaches a value determined by said bias means.

References Cited in the file of this patent

UNITED STATES PATENTS

| | | |
|---|---|---|
| 2,392,434 | Tucksess | Jan. 8, 1946 |
| 2,423,114 | Potter | July 1, 1947 |
| 2,444,472 | Schooley | July 6, 1948 |
| 2,562,744 | Schultz | July 31, 1951 |
| 2,638,571 | Schultz | May 12, 1953 |
| 2,688,722 | Dunn | Sept. 7, 1954 |
| 2,693,568 | Chase | Nov. 2, 1954 |
| 2,726,356 | Rockafellow | Dec. 6, 1955 |
| 2,767,364 | Guggi | Oct. 16, 1956 |
| 2,809,341 | Silver | Oct. 8, 1957 |
| 2,875,395 | Blashfield | Feb. 24, 1959 |
| 2,896,147 | Huge | July 21, 1959 |
| 2,903,639 | Meszaros | Sept. 8, 1959 |
| 2,903,640 | Bixby | Sept. 8, 1959 |
| 2,916,688 | Weir | Dec. 8, 1959 |
| 2,925,548 | Scherer | Feb. 16, 1960 |
| 2,936,413 | Searcy | May 10, 1960 |
| 2,955,247 | Moyer et al. | Oct. 4, 1960 |